United States Patent Office 3,363,451
Patented Jan. 16, 1968

3,363,451
GAS LEAK DETECTOR HAVING LEAK CONCENTRATION RESPONSIVE INDICATING MEANS
John A. Roberts, Lynnfield Center, Mass., assignor to General Electric Company, a corporation of New York
Filed Oct. 23, 1964, Ser. No. 405,903
15 Claims. (Cl. 73—40.7)

ABSTRACT OF THE DISCLOSURE

A leak detector including a lamp having a flashing frequency proportional to leak concentration. A leak sensor signal voltage is added to a bias voltage to charge a capacitor until a thyratron connected across the capacitor breaks down allowing complete discharge of the capacitor. Conduction of the thyratron controls the lamp.

Background of the invention

This invention relates to improvements in leak detectors of a type described in United States Patent 3,065,411, granted Nov. 20, 1962, to John A. Roberts, and assigned to the same assignee as the present application.

The aforesaid patent illustrates the use of a lamp located in the sampling probe for giving the operator a visual indication of the relative magnitude of the leak being sensed by the probe. The indicating system of the Roberts patent provides visual indications the number of which is proportional to the magnitude of the leak. However, such a system is inherently incapable of continuously providing this type indication as the probe is moved over the surface being tested since the circuit has to be "reset" after it has given a complete series of indications before it will respond to a new concentration level. Resetting is accomplished by removing the probe from the area of contamination and then returning it to the new area to be checked. This procedure has been found to be difficult for operators to master when trying to localize a leak by locating the point of greatest concentration. It would be much preferred if the leak indication continuously indicated the level of concentration as the probe was moved through areas of varying concentrations. This would considerably simplify the operator's task of locating the point of highest concentration since the probe would merely have to be moved in the direction of higher concentrations without necessitating repeated "resetting" of the leak detector to determine whether a higher concentration can be found than those previously sensed.

Furthermore, in accordance with the Roberts patent, visual indications are obtained in response to the application of a large surge of current to an incandescent lamp. This requires the development of a considerable amount of power in the leak detector, thus necessitating the utilization of a conductive discharge device having a high current rating. Such devices, in turn, call for a considerable amount of signal amplification in order to provide sufficient power to properly control the discharge device utilized. For example, assuming a representative detector output signal of 1 µA. is applied to the Roberts detector, sufficient amplification has to be provided to control a thyratron capable of handling 150 ma. when rendered conductive.

Values of such magnitudes necessitated the use of a more expensive amplifier and control components. Furthermore, the utilization of such a high-gain system rendered the circuit sensitive to transients which, when amplified, were capable, under favorable conditions, of firing the control thyratron even when no leak was being sensed. This interfered with the effective use of the leak detector since it was capable of being excited by transients to give erroneous output indications.

The service life of incandescent lamps in the sampling probe was also found to be unduly short due to the shocks associated with the normal handling of the probe. These shocks have been found to cause the lamp filaments to open, thus rendering the leak detector completely inoperative until the indicating lamp could be replaced. Furthermore, the detector of the Roberts patent was much too large and heavy for convenient use as a portable detector. It is therefore highly desirable to provide a light and compact detector without sacrificing sensitivity.

It is therefore an object of this invention to provide a new and improved leak detector in which the frequency of leak indications is continuously related to the magnitude of the concentration being sensed by the probe of the detector.

It is another object of this invention to provide a new and improved leak detector which is less expensive and requires the expenditure of less power than comparable prior art detectors.

It is yet another object of this invention to provide a new and improved leak detector indicating circuit of greater stability.

It is a further object of this invention to provide a new and improved leak detector indicating circuit which is substantially insensitive to transient signals.

It is still another object of this invention to provide a new and improved leak detector which utilizes more rugged and shock-resistant components.

It is also an object of my invention to provide a light, compact leak detector without sacrificing sensitivity.

Further objects and advantages of the invention will become apparent as the following description proceeds, and the features of novelty which characterize the invention will be pointed out with particularity in the claims annexed to and forming a part of this specification.

Summary

In accordance with the invention, a signal voltage proportional to the leak being detected is connected in series-aiding relationship with a variable bias voltage across a capacitive storage means to control the charge thereon in accordance with the relationship between the signal and bias voltages. This capacitive storage means is, in turn, connected between the control and common electrodes of the conductive device, the device presenting a very high impedance between said electrodes when it is in its nonconductive condition. In accordance with the invention, leak indications are provided by coupling a gaseous discharge indicator to the output circuit of the conductive device which is capable of being rendered conductive upon the passage of a control current having a magnitude greater than a predetermined value. Consequently, whenever a charge upon the capacitive storage means is sufficient to cause the passage of a control current of greater than the predetermined value, the conductive device will be rendered conductive to energize the indicator to give a single indication. After completion of the discharge of the capacitive storage means, the gaseous conductive device will be rendered nonconductive by the removal of the voltage appearing between the output and common electrodes. This will cause the impedance between the control and common electrodes to return to its high impedance state, thus permitting the recharging of the capacitive means under control of the bias voltage and signal voltage. It will be recognized that the rate at which the capacitive storage means is charged and discharged will, for any given magnitude of bias voltage, be proportional to the magnitude of the signal voltage. Thus, the flashing rate of the indicator will be proportional to the magnitude of the signal voltage and thus be proportional to the leak being detected.

Brief description of the drawings

For a better understanding of this invention, reference may be had to the following specification, taken in view of the accompanying drawings in which:

FIGURE 1 is a schematic representation in block diagram form of the leak detector of my invention; and FIGURE 2 is a schematic diagram of the circuits of the detector of FIGURE 1.

Description of the preferred embodiment

Referring to FIGURE 1, a leak detector system is shown as including a probe 1 connected by tube 2 to the inlet of vacuum pump 3, the output of which is coupled by tube 4 to the input of detection and indicating circuit 5.

Probe 1, which is adapted to be held by the operator when probing for the leak, comprises a tubular plastic member having an aperture in the end which is coupled to a thin, flexible tubing 9 carried by tube 2. As is well known in the art, probe 1 is moved relative to an enclosed system to which a tracer gas of the halogen family has been introduced, to detect and localize leakage in the system by detecting the presence of halogen gas on the outside of the enclosure. In accordance with the teachings of the Roberts patent, indications of the magnitude of the leak may be obtained by utilizing a lamp and locating it in probe 1 so that the operator, when probing regions suspected of leakage, need only watch the probe that he is handling rather than more remote equipment. To facilitate such usage, probe 1 has a transparent portion 6 which surrounds indicator lamp 7. Means is provided by a pair of conductors 8 to connect indicator lamp 7 to detection and indicating circuit 5. This pair of conductors may be conveniently incorporated, along with the thin, flexible tubing 9 within tube 2 in any convenient manner.

Reference may now be had to FIGURE 2 which discloses the detecting and indicating circuits of my invention. Samples of the atmosphere in the region probed are drawn through thin tubing 9, vacuum pump 3, and tubing 4 and then introduced between the electrodes of detector 10. In a manner well known in the art, the presence of a halogen tracer gas between emitter 11 and collector 12 greatly increases the degree of ionization of the detector and produces an avalanche of positive ions. These ions are collected by collector 12 and result in increased current flow through battery 13 and resistor 14.

Means is provided by batteries 15 and 16 and potentiometer 17 to provide a bias voltage between the slider of potentiometer 17 and conductor 19 which is variable over a range of values so as to permit the measurement of a wide range of concentration levels. The slider of potentiometer 17 is connected to current-limiting resistor 14 through signal resistor 18. Resistor 14 is provided to protect detector 20 from destruction if conductor 20 is shorted to ground in some manner. The polarity of the signal developed across resistor 18 in response to the signal current flowing in detector 10 is of such a polarity relative to the variable bias voltage as to result in their being connected in series-aiding relationship between conductors 19 and 20. Thus, the series-connected bias and signal voltages appear across capacitive storage means 21 which is connected between the control electrode 22 and common electrode 23 of conductive device 24. This device may conveniently be a cold cathode thyratron tube sold commercially as the NE-77.

Means is provided by conductors 8 for coupling indicator lamp 7 to the output electrode 25 of thyratron 24 so that the lamp will be energized each time thyratron 24 is rendered conductive. In accordance with the preferred embodiment of my invention, I utilize an NE2-H as my indicator lamp. This device requires a current flow of only 2 ma. to provide an acceptable visible flash. The output circuit of thyratron 24 is completed through diode 26, current-limiting resistor 27, and A-C power source 28.

Resistors 29 and 30 provide means for balancing the impedances presented to source 28 due to the connection of two gaseous discharge devices, i.e., thyratron 24 and lamp 7, in series across the source. These resistors, which are essentially infinite impedances when in their nonconductive state, provide means for controlling the potentials across indicator lamp 7 and thyratron 24 so that they may be fired under the proper conditions. Capacitor 31, which is connected in parallel with compensating resistor 29, provides means to compensate for changes in impedance presented to source 28 by conductors 8 and lamp 7 when probe 1 is being handled by the operator in the process of detecting leaks. This prevents erroneous leak indications which would otherwise occur in response to the probe being handled.

Neon bulb 32, which is located within enclosure 33 with thyratron 24, is utilized so as to irradiate thyratron 24 with a substantially constant light level in order to stabilize its point of conduction.

Balance control potentiometer 17 permits the variation of the bias voltage so as to permit the selection of a value which will cause the potential across capacitor 21 to be less than a value which will cause thyratron 24 to fire in the absence of a detector output signal. Normally, potentiometer 17 is adjusted to a value slightly less than the firing potential of the thyratron, i.e., one volt, so that upon the generation of a signal voltage in response to the sensing of a leak, capacitor 21 will only have to receive enough additional charge from detector 10 to cause the control voltage to exceed the break-down potential, thus causing thyratron 24 to become conductive. It should be noted that the firing of thyratron 24 is not merely a matter of providing a sufficiently large potential between the control electrode and the common electrode but it requires the source of control potential to be sufficiently low in impedance so as to be able to supply a control current which exceeds the value necessary to cause conduction between said common and said output electrodes. This control current is obtainable from capacitor 21 due to the extremely low resistance of its discharge path through the thyratron 24. However, it will be recognized that the charging of capacitor 21 is a function of not only the magnitude of the bias voltage but also the magnitude of the current flowing in resistor 14. It should be noted that since not only signal current but also background current flows in signal resistor 18, adjustment of potentiometer 17 permits the selection of the proper operating point for control electrode 22 under varying conditions of background current. The position slider 17 has substantially no effect upon the signal voltage developed across resistor 18 since detector 10 is a constant current source and thus is not affected by variations in the position of the slider of potentiometer 17. Battery 16 is provided to extend the range of balance control potentiometer 17 for higher levels of background current.

Means is provided by sensitivity switch 37 to change the flashing rate of indicator 7 for a given signal size by changing the RC time constant of the circuit by connecting resistor 35 and capacitor 36 in circuit. This is necessary to permit the measurement of a wide range of signal levels since the upper limit of visibility of the flashes of indicator 7 is of the order of 10 flashes per second. Therefore, sensitivity control switch 37 is provided in order to permit the measurement of a range of leak sizes while still keeping the flashing rate below 10 flashes per second. This is accomplished by lowering the effective resistance of the network across which the signal voltage is developed. This is accomplished by connecting resistor 35 in parallel with resistor 18, thus decreasing the signal voltage developed for any given magnitude of signal current. The flashing rate is further reduced by the addition of capacitor 35 in parallel with capacitor 21 to increase the capacity of the capacitive storage means, thus increasing the RC time constant of the circuit.

The following table lists the value of the circuit components associated with detection and indicating circuit 5 which have been found to be desirable:

*Part designation*

| | | |
|---|---|---|
| 7 | | NE2–H |
| 13 | v | 180 |
| 14 | | 100K |
| 15 | v | 180 |
| 16 | v | 60 |
| 17 | | 500K |
| 18 | meg | 4.7 |
| 21 | μf | .01 |
| 24 | | NE77 |
| 26 | | 1N648 |
| 27 | ohms | 470 |
| 28 | v. a-c | 135 |
| 29 | meg | 10 |
| 30 | meg | 15 |
| 31 | μμf | 470 |
| 32 | | NE2–H |
| 35 | meg | 2.2 |
| 36 | μf | .047 |
| 40 | | 33K |

While there have been described what are at present considered to be preferred embodiments of the invention, it will be apparent to those skilled in the art that various changes and modifications may be made therein without departing from the spirit or scope of the invention.

What I claim as new and desire to secure by Letters Patent of the United States is:

1. A gas leak dector for providing a leak indication comprising means for generating a signal current proportional to the leak being detected,
   a bias voltage source,
   means for providing a signal voltage proportional to said signal current and connecting it in series-aiding relationship with said bias voltage,
   capacitive storage means,
   means for applying said series-connected voltages across said capacitive storage means,
   a conductive device having control, common and output electrodes, said conductive device being capable of assuming either a conductive or a nonconductive condition, said device presenting a very high impedance between said control and common electrodes when in said nonconductive condition,
   means connecting said capacitive storage means between said control and common electrodes, said conductive device being switchable from said nonconductive to said conductive condition upon the passage of a control current of greater than a predetermined value in response to the discharge of said capacitive storage means, said predetermined value being larger than the value of said signal current, said bias voltage source being set at a value which will cause said control current to assume a value slightly less than said predetermined current when no leak is applied to said signal current generating means whereby said signal current generating means only has to supply enough charge to said capacitive storage means to cause said control current to exceed said predetermined value, said signal current generating means being a constant current source not affected by changes in bias voltage,
   an indicating device, and
   means coupling said indicating device to said output electrode so as to be rendered operative each time said discharge device becomes conductive, said indicating device indicating the frequency of conduction of said conductive device to thereby indicate the magnitude of the leak.

2. The combination of claim 1 in which said bias voltage source is variable to permit the adjustment of the magnitude of said bias voltage.

3. The combination of claim 2 in which said signal current generating means comprises means for sampling said leak, a leak sensor and a conduit for coupling the output of said sampling means to said sensor,
   said indicating device comprising a first gaseous discharge device located in said sampling means,
   said discharge device coupling means comprising a pair of conductors extending between said sampling means and said conductive device.

4. The combination of claim 3 further comprising means to compensate for changes in impedance appearing between said pair of conductors to prevent erroneous leak indications when said sampling means is being handled by the operator when detecting leaks.

5. The combination of claim 4 further comprising a source of A-C power connected in series with said gaseous indicating device between said output electrode and said common electrode,
   said conductive device comprising a second gaseous discharge device,
   a first resistance connected in shunt with said first gaseous discharge device, and
   a second resistance connected between said output electrode and said control electrode of said second gaseous discharge device.

6. The combination of claim 5 further comprising unidirectional conductive means connected in series with said source of A-C power to prevent the application of a reverse voltage across said second gaseous discharge device.

7. The combination of claim 6 further comprising means for irradiating said second gaseous discharge device with a substantially constant light level to stabilize the conductive point of said second discharge device.

8. The combination of claim 7 in which said irradiating means comprises a third gaseous discharge device connected to be energized by said source of A-C power.

9. The combination of claim 8 further comprising a second capacitive storage means, a switching device and means for connecting said second storage device in parallel with the first capacitive storage device in response to the operation of said switching device to its operated condition to reduce the sensitivity of the leak detector.

10. The combination of claim 9 further comprising means coupled to said signal voltage generating means in response to said switching device assuming said operated condition for reducing the magnitude of the signal voltage for any given leak size to thereby reduce the sensitivity of the leak detector.

11. The combination of claim 2 in which said signal current generating means comprises a first source of D-C potential and a leak sensor connected to form a series circuit with said first D-C source,
   said bias voltage source comprising a second source of D-C potential connected in series with said series circuit between said first source of D-C potential and said common electrode,
   said first and second source of D-C potential being connected in series-aiding relationship.

12. The combination of claim 11 in which said signal voltage providing means comprises a potentiometer connected across said second source of D-C potential,
   a resistance, and
   means for connecting said resistance between the leak sensor end of said series circuit and the movable tap on said potentiometer to develop a signal voltage proportional to said signal current flowing in said sensor.

13. The combination of claim 12 in which said applying means comprises a conductor for connecting a point common to said leak sensor and said resistance to a point common to said capacitive storage means and said control electrode.

14. The combination of claim 13 further comprising a second capacitive storage means, a switching device, and means for connecting said second storage device in parallel with the first storage device in response to the operation of said switching device to its operated condition to reduce the sensitivity of the leak detector.

15. The combination of claim 14 further comprising a second resistance, and means for connecting said second resistance in parallel with the first resistance in response to said switching device assuming said operated condition for reducing the magnitude of the signal voltage developed across said first resistance for any given leak size to thereby reduce the sensitivity of the leak detector.

References Cited

UNITED STATES PATENTS

| | | | |
|---|---|---|---|
| 2,526,038 | 10/1950 | Nelson. | |
| 2,904,782 | 9/1959 | Craddock | 340—331 X |
| 2,996,661 | 8/1961 | Roberts | 73—40.7 X |
| 3,076,139 | 1/1963 | Roberts | 324—33 |
| 3,287,636 | 11/1966 | Gagniere | 324—54 |

THOMAS B. HABECKER, *Acting Primary Examiner.*

NEIL C. READ, *Examiner.*

D. K. MYER, *Assistant Examiner.*